United States Patent
Bosgaerd et al.

(10) Patent No.: US 11,008,248 B2
(45) Date of Patent: May 18, 2021

(54) COATED SUBSTRATE

(71) Applicants: AGC GLASS EUROPE, Louvain-la-Neuve (BE); AGC Inc., Chiyoda Ku (JP); AGC GLASS COMPANY NORTH AMERICA, Alpharetta, GA (US); AGC VIDROS DO BRASIL LTDA, Guaratingueta (BR)

(72) Inventors: Eric Bosgaerd, Ways (BE); Eugenie Peyroux, Dworp (BE)

(73) Assignees: AGC GLASS EUROPE, Louvain-la-Neuve (BE); AGC Inc., Chiyoda Ku (JP); AGC GLASS COMPANY NORTH AMERICA, Alpharetta, GA (US); AGC VIDROS DO BRASIL LTDA, Guaratingueta (BR)

( * ) Notice: Subject to any disclaimer, the term of this patent is extended or adjusted under 35 U.S.C. 154(b) by 0 days.

(21) Appl. No.: 16/609,986

(22) PCT Filed: Apr. 27, 2018

(86) PCT No.: PCT/EP2018/060964
§ 371 (c)(1),
(2) Date: Oct. 31, 2019

(87) PCT Pub. No.: WO2018/202595
PCT Pub. Date: Nov. 8, 2018

(65) Prior Publication Data
US 2020/0079687 A1    Mar. 12, 2020

(30) Foreign Application Priority Data

May 4, 2017 (EP) .................................. 17169548

(51) Int. Cl.
| | | |
|---|---|---|
| *B32B 15/04* | (2006.01) | |
| *B32B 17/06* | (2006.01) | |
| *C03C 17/36* | (2006.01) | |
| *E06B 3/67* | (2006.01) | |
| *E06B 9/24* | (2006.01) | |

(52) U.S. Cl.
CPC ........ *C03C 17/366* (2013.01); *C03C 17/3644* (2013.01); *C03C 17/3649* (2013.01); *C03C 17/3681* (2013.01); *E06B 3/6715* (2013.01); *E06B 9/24* (2013.01); *C03C 2217/212* (2013.01); *C03C 2217/228* (2013.01); *C03C 2217/78* (2013.01); *C03C 2218/113* (2013.01); *C03C 2218/156* (2013.01); *E06B 2009/2417* (2013.01)

(58) Field of Classification Search
CPC .................. C03C 2218/113; C03C 17/366
USPC ............... 428/426, 428, 432, 688, 701, 702
See application file for complete search history.

(56) References Cited

U.S. PATENT DOCUMENTS

| 4,799,963 | A | * | 1/1989 | Basil | C09D 183/04 106/287.12 |
|---|---|---|---|---|---|
| 5,316,854 | A | * | 5/1994 | Lin | C03C 17/007 106/287.13 |
| 5,318,830 | A | * | 6/1994 | Takamatsu | B32B 17/10036 428/216 |
| 5,403,368 | A | * | 4/1995 | Takahashi | C03C 1/008 65/17.2 |
| 5,480,722 | A | | 1/1996 | Tomonaga et al. | |
| 5,876,854 | A | * | 3/1999 | Kawazu | C03C 17/007 359/359 |
| 5,976,678 | A | * | 11/1999 | Kawazu | B32B 17/10339 427/165 |
| 6,037,289 | A | * | 3/2000 | Chopin | C03C 17/008 502/2 |
| 6,071,606 | A | * | 6/2000 | Yamazaki | C03C 17/007 428/325 |
| 6,387,844 | B1 | * | 5/2002 | Fujishima | A61L 9/205 427/164 |
| 6,582,839 | B1 | * | 6/2003 | Yamamoto | C03C 17/23 428/323 |
| 7,612,015 | B2 | * | 11/2009 | Anzaki | A01N 59/16 427/162 |
| 7,659,001 | B2 | * | 2/2010 | Varaprasad | C03C 8/14 428/432 |
| 7,923,114 | B2 | * | 4/2011 | Myli | C03C 17/36 428/426 |
| RE43,817 | E | * | 11/2012 | Krisko | C03C 17/3417 428/432 |
| RE44,155 | E | * | 4/2013 | Krisko | C03C 17/3423 428/432 |
| 9,102,565 | B2 | * | 8/2015 | Durandeau | C03C 17/3681 |
| 9,272,949 | B2 | * | 3/2016 | Varaprasad | C03C 17/002 |
| 2002/0122962 | A1 | * | 9/2002 | Arfsten | G02B 5/208 428/697 |
| 2003/0026964 | A1 | * | 2/2003 | Muromachi | B32B 17/10761 428/212 |
| 2006/0029813 | A1 | * | 2/2006 | Kutilek | C03C 17/3435 428/426 |
| 2007/0031681 | A1 | * | 2/2007 | Anzaki | C03C 17/3417 428/432 |
| 2007/0099000 | A1 | * | 5/2007 | Hirano | C09D 185/00 428/432 |

(Continued)

FOREIGN PATENT DOCUMENTS

| JP | 09328336 | * 12/1997 |
|---|---|---|
| JP | 2000-262367 A | 9/2000 |
| JP | 2000262367 | * 9/2000 |

OTHER PUBLICATIONS

JP09328336 English machine translation.*
International Search Report dated Aug. 9, 2018 in PCT/EP2018/060964 filed Apr. 27, 2018.

*Primary Examiner* — Lauren R Colgan
(74) *Attorney, Agent, or Firm* — Oblon, McClelland, Maier & Neustadt, L.L.P.

(57) ABSTRACT

The present invention relates to a coated substrate comprising: a substrate; a soft coating provided on at least a part of at least one face of the substrate; a protective sol-gel coating provided on at least a part of said face above the soft coating, (Continued)

to a process for making such coated substrate and to glazing units comprising such coated substrate.

20 Claims, No Drawings

(56) References Cited

U.S. PATENT DOCUMENTS

| | | | | |
|---|---|---|---|---|
| 2007/0128449 A1* | 6/2007 | Taylor | C03C 17/3644 | 428/432 |
| 2007/0148064 A1* | 6/2007 | Labrousse | C03C 17/3441 | 422/211 |
| 2007/0218264 A1* | 9/2007 | Gueneau | G02F 1/133305 | 351/159.62 |
| 2007/0243391 A1* | 10/2007 | Varaprasad | C03C 17/36 | 428/426 |
| 2007/0254163 A1* | 11/2007 | Veerasamy | C03C 17/3618 | 428/432 |
| 2007/0254164 A1* | 11/2007 | Veerasamy | C03C 17/36 | 428/432 |
| 2008/0115471 A1* | 5/2008 | Labrousse | C03C 17/3417 | 55/385.3 |
| 2008/0268260 A1* | 10/2008 | Varaprasad | C03C 17/366 | 428/429 |
| 2009/0047466 A1* | 2/2009 | German | C03C 17/3652 | 428/98 |
| 2009/0047509 A1* | 2/2009 | Gagliardi | C03C 17/3639 | 428/336 |
| 2009/0274914 A1* | 11/2009 | Hoshi | C03C 17/32 | 428/432 |
| 2010/0304059 A1* | 12/2010 | Besson | C09K 11/7769 | 428/34 |
| 2011/0212311 A1* | 9/2011 | Lemmer | E06B 7/12 | 428/212 |
| 2012/0149556 A1* | 6/2012 | Laurent | B01J 35/004 | 502/200 |
| 2013/0202878 A1* | 8/2013 | Carella | C08K 3/22 | 428/323 |
| 2018/0171162 A1* | 6/2018 | Fadeev | C09D 5/32 | |
| 2020/0079687 A1* | 3/2020 | Bosgaerd | C03C 17/3644 | |

* cited by examiner

COATED SUBSTRATE

TECHNICAL FIELD OF THE INVENTION

The invention relates to a coated substrate provided with a soft coating such as a solar control or an insulating low-E coating with an increased mechanical, chemical and corrosion resistance thanks to the presence above the soft coating of a protective sol-gel coating. The invention also relates to the process for making such a coated substrate. Particularly, the invention relates to a coated glass substrate provided with a soft coating and a protective sol-gel coating that may be heat treated and to multiple glazing and laminated glazing comprising said coated glass substrate.

BACKGROUND OF THE INVENTION

A large part of soft coatings such as solar control or insulating low-E coatings present a low emissivity and are used in glazing for their IR reflecting ability, allowing a precise energy control of the glazing, thereby reducing heat loss and/or avoiding over-heating of a glazed structure. Unfortunately, the limited mechanical, chemical and corrosion resistance of most soft coatings limits their use. Indeed, such coatings can be easily damaged by exposure to the environment during their production or during their lifetime. Mechanical actions such as contact or friction with other materials or objects can create scratches or mars. Modifications of the chemical environment (humidity, temperature . . . ) or contact with chemicals like detergent or everyday life products leads to a degradation of the soft coating surface. The result of such deteriorations could be both aesthetic and functional. This is particularly true for soft coatings that rely on metal-based infrared reflecting layers. Even if some soft coatings, without metal-based infrared reflecting layers can be used on exterior faces of glazing, their durability does not reach that of hard coatings produced by chemical vapor deposition (CVD).

During the production of coatings on glass sheets, the coated sheets are often scratched due to one or more of: (a) rubbing up against other sheets or the like during shipment; (b) pliers used by glass handlers during and/or proximate cutting or edge seaming steps; (c) abrasion caused by gloves worn by glass handlers; (d) brushes during washing step; and (e) other types of rubbing/abrasion caused during any step at fabricator premises. Additionally, corrosion is also a significant cause of damage and is often caused by high humidity conditions, acid rain, and/or other materials which tend to collect on the coated articles during transport, storage and/or handling.

While the aforesaid types of damage often occur prior to heat treatment (e.g., tempering), the tempering of the coated sheets typically magnifies such damage. For example, a minor bit of corrosion which was caused pre-tempering can lead to a significant blemish upon heat treatment which causes the coated sheet to be scrapped.

Many applications or markets are demanding soft coatings, particularly solar control or insulating low-E coatings for their opto-energetic properties and their ability to block a portion of the IR spectrum. However, the limited mechanical, chemical and/or corrosion resistance of soft coatings limits their use in simple glazing, for interior or exterior use, or in the case of multiple glazing their use in external positions, i.e. on the external faces of the glazing.

A known method to obtain a glazing with a protected low-E coating is to make use of energy saving window films such as those commercialized by Nitto under the names Penjerex® PX-7060S or Penjerex® PX-8080. These adhesive films contain a low-E coating protected by a polyester film. However, for durability reasons, such films can only be used on the face of the glazing in contact with the interior of a building, they are not heat treatable and oblige the windows maker or the end user to install them on site.

Deposition of a sol-gel coating on a low-E undercoat on glass is disclosed in US20070243391. The sol-gel coating aims at efficiently blocking ultraviolet (UV) radiations and comprises very high amounts of cerium oxide as UV blocker. US20070243391 is silent about the mechanical, chemical and corrosion protection of the low-E coating and the impact of this sol-gel coating on the emissivity of the low-E coating.

Thus, there is a need to develop coated substrates, particularly glass substrates provided with a soft coating having improved mechanical, chemical and corrosion resistance while not significantly impacting the emissivity and/or the aesthetics of the coating.

SUMMARY OF THE INVENTION

Against this background we now provide a coated substrate comprising:
  a substrate,
  a soft coating provided on at least a part of at least one face of the substrate,
  a sol-gel coating provided on at least a part of said face above the soft coating,
wherein the sol-gel coating comprises a mixture of titanium oxide, silicon oxide and optionally bismuth oxide and/or cerium oxide.

One objective of the invention is to provide in at least one of its embodiments a coated substrate comprising a soft coating having improved mechanical, chemical and corrosion resistance thanks to the presence of the sol-gel coating.

Another objective of the invention is to provide in at least one of its embodiments a coated substrate comprising a solar control or insulating low-E coating deposited by Physical Vapor Deposition (PVD) and having improved mechanical, chemical and corrosion resistance thanks to the presence of the sol-gel coating while the emissivity of the solar control or insulating low-E coating is not significantly impacted.

It is yet another objective of the invention to provide in at least one of its embodiments a coated substrate having a long-lasting soft coating thanks to the presence of the sol-gel coating.

It is still another objective of the invention in at least one of its embodiments to provide a coated substrate having a long-lasting solar control or insulating low-E coating deposited by PVD thanks to the presence of the sol-gel coating while the emissivity of the solar control or insulating low-E coating is not significantly impacted.

It is yet another objective of the invention in at least one of its embodiments to provide a coated substrate having a long-lasting soft coating that can be exposed to the environment, i.e. that can be applied on faces of the substrate in contact with the environment.

It is still another objective of the invention in at least one of its embodiments to provide a coated glass substrate that is suitable to be heat treated or suitable to be tempered.

It is still another objective of the present invention to provide in at least one of its embodiments a coated substrate of which the face covered by the soft coating and the sol-gel coating is suitable to resist to the mechanical, chemical and corrosion attacks.

It is another objective of the present invention to provide in at least one of its embodiments a long-lasting coated substrate for saving energy in applications such as buildings, home appliances, transportation (automobile, bus, boat, train, tramway and the like) or greenhouses.

It is yet another objective of the invention in at least one of its embodiments to provide a coated substrate wherein the soft coating is already protected when provided to the customer or end user who has no additional protection step to perform.

The present invention also provides a process for making the coated substrate.

The present invention also provides glazing units comprising the coated substrate wherein the substrate is glass, and particularly single or multiple glazing units.

It is an objective of the present invention to provide in at least one of its embodiments glazing units allowing the face of the coated glass substrate covered by the soft coating and the sol-gel coating to face the outside of the unit, i.e. to be in contact with the exterior of the glazing, thanks to improved mechanical, chemical and corrosion resistance

DESCRIPTION OF THE INVENTION

In a first aspect of the invention, there is provided a coated substrate comprising:
a substrate,
a soft coating provided on at least a part of at least one face of the substrate,
a sol-gel coating provided on at least a part of said face above the soft coating,
wherein the sol-gel coating comprises a mixture of titanium oxide, silicon oxide and optionally bismuth oxide and/or cerium oxide in theoretical weight ratios of:
titanium oxide $TiO_2$/silicon oxide $SiO_2$ ranging from 0.10 to 3,
bismuth oxide $Bi_2O_3$/silicone oxide $SiO_2$ ranging from 0 to 0.03,
cerium oxide $CeO_2$/silicone oxide $SiO_2$ ranging from 0 to 0.03.

The substrate according to the invention can be any substrate such as for instance glass and transparent polymers such as polycarbonate (PC), polyethylene terephthalate (PET), polystyrene (PS), polyvinyl chloride (PVC). The substrate according to the invention may be flat or curved/bended. It is preferably a glass substrate. According to the invention, the substrate is more preferably a glass sheet. According to an embodiment, the glass sheet is a float glass sheet. The term "float glass sheet" is understood to mean a glass sheet formed by the float method, which consists in pouring the molten glass onto a bath of molten tin, under reducing conditions. A float glass sheet comprises, in a known way, a "air face" and a "tin face", the last one being a face enriched in tin in the body of the glass close to the surface of the sheet. The term "enrichment in tin" is understood to mean an increase in the concentration of tin with respect to the composition of the glass at the core, which may or may not be substantially zero (devoid of tin). Therefore, a float glass sheet can be easily distinguished from sheets obtained by other glassmaking methods, in particular by the tin oxide content which may be measured, for example, by electronic microprobe to a depth of ~10 microns. In many cases and as illustration, this content lies between 1 and 5 wt %, integrated over the first 10 microns starting from the surface.

Alternatively, according to another embodiment, the glass sheet is a cast or drawn glass sheet.

The glass sheet according to the invention is made of glass whose matrix composition is not particularly limited and may thus belong to different categories. The glass may be a soda-lime-silicate glass, an alumino-silicate glass, an alkali-free glass, a boro-silicate glass, etc. It may be a clear, extra-clear/low-iron or coloured glass sheet. Preferably, the glass sheet of the invention is made of a soda-lime glass or an alumino-silicate glass. Non-limiting examples of glass sheets are Planibel® Clear, Linea Azzura®, Dragontrail®, Tirex®, Falcon®, Clearvision®, Clearlite®.

The glass sheet of the invention can be of any desired dimensions, such as length, width, shape and/or thickness. In one embodiment, the glass sheet of the invention may have a thickness of from 0.1 to 25 mm.

For the purpose of the present invention a soft coating is a coating comprising one or more layers deposited by physical vapor deposition (PVD) in particular by magnetron sputtering. In particular, a soft coating may comprise one or more metal based infrared reflecting layers that are typically surrounded by two or more dielectric layers. The metal based infrared reflecting layer is most often based on silver but may also be based on metals such as for example nickel, chromium, niobium, tungsten, zirconium, titanium stainless steel or mixtures thereof. The dielectric layers may comprise one or more metal oxides or metal nitrides or metal oxynitrides or metal carbides or diamond-like carbon layers. A soft coating may also be devoid of any metallic layer and comprise only one or more layers of one or more metal oxides or metal nitrides or metal oxynitrides or metal carbides or diamond-like carbon or transparent conductive oxides.

Soft coatings produced by PVD have generally a limited mechanical, chemical and corrosion resistance hence limiting their possible uses in contact with the external environment.

The soft coating is particularly a solar control or insulating low-E coating. For example, and without limitation, such solar control or insulating low-E coatings may be single silver, double silver or triple silver coating stacks, or any of the coatings in any of the following WO2005012200, WO2006122900, WO2007138097, WO2011147875, WO2011147864, WO2013079400, WO2014191472, WO2014191474, WO2014191484, all of which are hereby incorporated by reference.

Suitable soft coatings in the frame of the present invention are for instance Sunlux or Stopsol commercialized by Asahi Glass Company. Examples of solar control or insulating low-E coating suitable for the invention are Silver Smart 30/51/69, Planibel AS, iplustop 1.1 T, iplustop advanced 1.0 T also commercialized by Asahi Glass Company.

The soft coating of the invention is provided on at least a part of at least one face of the substrate. It can be provided on a part of said face or substantially on the entire said face. It can be provided on a part of the face as it is the case for the so called edge deleted glass sheet. In this case, the soft coating is removed on the periphery of the face of the coated glass sheet. It can alternatively be provided substantially on the entire said face. By substantially on an entire entity (here the face) is meant in the frame of this invention that at least 90% of the entity is covered, preferably at least 95%, more preferably at least 97%, most preferably 100% of the entity is covered. The soft coating can be provided on anyone of the faces of the substrate or on both faces.

The sol-gel coating as claimed in the present invention comprises a mixture of titanium oxide, silicon oxide and optionally bismuth oxide and/or cerium oxide in theoretical weight ratios of:

titanium oxide TiO2/silicon oxide SiO2 ranging from 0.10 to 3, bismuth oxide Bi2O3/silicone oxide SiO2 ranging from 0 to 0.03, cerium oxide CeO2/silicone oxide SiO2 ranging from 0 to 0.03.

The claimed ranges also comprise the limits of the ranges.

The theoretical weight of a metal oxide of the sol-gel coating is defined by the following formula:

$$\text{Theoretical weight} = n(\text{Metal oxide precursors}) \cdot M_{eq}(\text{Metal oxide})$$

where, n(Metal oxide precursors) is the total number of metal equivalents in the precursor(s) of a given metal oxide present in the sol-gel solution. Equivalent has here its general meaning, i.e. number of moles of precursor multiplied by the number of metal elements in the precursor. Depending on the sol-gel solution, there might be one or more precursors of a given metal oxide. If there is a single precursor, n is the number of metal equivalents of that given precursor. If there are for instance two precursors, n=n1+n2, where n1 is the number of metal equivalents of the first precursor and n2 is the number of metal equivalents of the second precursor, $M_{eq}$(metal oxide) is the metal equivalent weight of the metal oxide expressed in g/eq. The metal equivalent weight is the molar weight of the metal oxide divided by the number of metal element in the metal oxide (for Bi2O3, the metal equivalent weight is the molar weight divided by 2).

It has to be noted that the same theoretical weight formula applies for metalloid and non-metal species. An example is for SiO2:

$$\text{Theoretical weight}(SiO2) = n(SiO2) \cdot M_{eq}(SiO2)$$

where, n(SiO2) is the number of moles of SiO2 multiplied by 1, $M_{eq}$(SiO2) is the same as the molar weight.

The theoretical weight ratio titanium oxide TiO2/silicon oxide SiO2 ranges from 0.10 to 3. The ratio is preferably at least 0.25, more preferably at least 0.5, most preferably at least 1. The ratio is preferably at most 2.5, more preferably at most 2, most preferably at most 1.5.

The theoretical weight ratio bismuth oxide Bi2O3/silicone oxide SiO2 ranges from 0 to 0.03. The ratio is preferably at most 0.02, more preferably at most 0.01.

The theoretical weight ratio cerium oxide CeO2/silicone oxide SiO2 ranges from 0 to 0.03. The ratio is preferably at most 0.02, more preferably at most 0.01.

Theoretical weight ratio and ratio will be used without distinction in the rest of the text.

The amounts of titanium oxide according to the invention advantageously allow improving the chemical and corrosion resistance of the layer system comprising the sol-gel coating and the soft coating.

The optional use of cerium oxide as doping agent in low amounts is advantageous as it does not impact significantly the color, it has particularly a low yellowing effect.

The sol-gel coating may further optionally comprise zirconium oxide and/or phosphorous oxide. When zirconium oxide is present, the ratio zirconium oxide/silicon oxide ranges from 0.10 to 3. The ratio is preferably at least 0.25, more preferably at least 0.5, most preferably at least 1. The ratio is preferably at most 2.5, more preferably at most 2, most preferably at most 1.5. The ratio titanium oxide/zirconium oxide 0.10 to 10. The ratio is preferably at least 0.25, more preferably at least 0.5, most preferably at least 1. The ratio is preferably at most 6, more preferably at most 4, most preferably at most 2.

Zirconium oxide, when present participates to the improvement of the mechanical resistance of the sol-gel coating such as its scratch resistance and to the improvement of the humidity resistance. It improves particularly the humidity resistance of the sol-gel coating. Amounts below the lower limit of the range produce no significant effect. Amounts above the upper limit of the range will consequently limit the amounts of silicium oxide and/or titanium oxide. In the sol-gel coating. Too low amounts of silicium oxide might be detrimental to the adhesion while too low amounts of titanium oxide might be detrimental to chemical resistance.

So, in some embodiments, the coated substrate of the invention comprises a soft-gel coating further comprising zirconium oxide in a theoretical weight ratio zirconium oxide ZrO2/silicon oxide SiO2 ranging from 0.10 to 3.

The sol-gel coating may optionally further comprise other metal oxides such as Al2O3, Fe2O3, SnO2 or any mixture of those. They may be present in a total amount of maximum 3 weight % of the coating composition. By weight percent is meant the weight of said metal oxide(s) divided by the weight of the coating expressed in the same weight unit, multiplied by 100. The values are expressed on the dry content.

The sol-gel coating may further optionally comprise certain additives or moieties such for instance as coloring components (eg. inorganic pigments) or moieties to confer hydrophobic or oleophobic or omniphobic properties.

The sol-gel coating is provided on at least a part of the face of the substrate provided with the soft coating and above the soft coating. Both the soft coating and the sol-gel coating can cover substantially the entire face of the substrate or they can both cover the same part of the face or the soft coating can cover a part of the face and the sol-gel coating can cover a larger part or substantially the whole face of the substrate. The sol-gel coating is provided above the soft coating and it can either be in direct contact with the soft coating or separated of the soft coating by one or more intermediate layers. The sol-gel coating is preferably provided in direct contact with the soft coating, i.e. no intermediate layer is present between the soft coating and the sol-gel coating on the portions of the surface where they are both present. It is more preferably provided in direct contact with the soft coating and at least substantially on the entire soft coating.

The thickness of the sol-gel coating typically ranges from 50 to 500 nm. The thickness is preferably at least 100 nm and preferably at most 350 nm. When the thickness is too low, the protective effect of the coating is less efficient and when the thickness is too high, the risk to create cracks into the coating during the curing of the sol-gel solution is high due to the shrinkage of the sol-gel.

The presence of the sol-gel layer of the invention above the soft coating advantageously brings a protection of the soft coating against mechanical, chemical and corrosion attacks. In other words, the coated substrate according to the invention comprises a soft coating having improved mechanical, chemical and corrosion resistance thanks to the presence of the sol-gel coating. It allows broadening the use of soft coatings, particularly solar control or insulating low-E coatings produced by the PVD method to applications where they are in contact with the external environment. They may for instance be used in simple glazing, for interior or exterior use, or in multiple glazing in external position, i.e. on the external faces of the glazing, those facing the external environment.

The presence of the sol-gel coating of the invention above a solar control or insulating low-E coating advantageously does not significantly impact the emissivity of the solar control or insulating low-E coating. It means that the emissivity measured according to EN 12898 without and with the sol-gel coating differs of at most 5%, preferably of at most 3%.

In a particular embodiment of the invention the coated substrate is heat treated. In this embodiment, the substrate is glass. The heat treatment may be one of those encountered in a bending (also known as curving), annealing (also known as strengthening) or tempering process. It is advantageous as more and more heat treated glass is requested in buildings and automotive applications namely for safety purposes. The heat treatment is known to the skilled person and is performed according to known methods. It generally comprises heating the glass sheet to a temperature between 300 and 800° C., in air, for example between 400° C. and 710° C., for a couple of seconds to several hours. The conditions are adapted depending on the heat-treatment type, the thickness and nature of the glass sheet, the type of soft coating and sol-gel coating applied. The treatment may comprise a rapid cooling step after the heating step, to introduce stresses difference between the surface and the core of the glass so that in case of impact, the so-called tempered glass sheet will break safely in small pieces. If the cooling step is less strong, the glass will then simply be annealed and in any case offer a better mechanical resistance.

In a particular variant of this embodiment, the coated glass substrate is tempered. As a result of its safety and strength, tempered glass is used in a variety of demanding applications, including windows, shower doors, architectural glass doors and tables, refrigerator trays, as a component of bulletproof glass, and various types of plates and cookware.

It is another object of the invention to provide a process for making a coated substrate according to the invention comprising the steps of:

a) forming a soft coating on at least a part of at least one face of the substrate, b) applying a sol-gel solution on at least a part of said face above the soft coating, c) curing the sol-gel solution to obtain a sol-gel coating comprising a mixture of titanium oxide, silicon oxide and optionally bismuth oxide and/or cerium oxide in theoretical weight ratios of:

titanium oxide TiO2/silicon oxide SiO2 ranging from 0.10 to 3, bismuth oxide Bi2O3/silicone oxide SiO2 ranging from 0 to 0.03, cerium oxide CeO2/silicone oxide SiO2 ranging from 0 to 0.03.

The substrate, the soft coating, the sol-gel coating are as described supra.

The process comprises the step of forming a soft coating. The soft coating is formed on the substrate according to any technique known to the skilled person. It may be applied for instance by sputtering by the well-known method of magnetron sputtering.

The soft coating is formed on at least a part of at least one face of the substrate. It can be provided on a part of said face or substantially on the entire said face. It can be provided on a part of the face as it is the case for a so called edge deleted glass sheet. In this case, the soft coating is removed on the periphery of the face of the coated glass. It can alternatively be provided substantially on the entire said face. The soft coating can be provided on anyone of the faces of the substrate or on both faces.

The process for making a coated substrate according to the invention comprises a step of applying a sol-gel solution on at least a part of the face of the substrate provided with the soft coating and above the soft coating.

The sol-gel solution is prepared according to known methods and comprises:
at least one silicon oxide precursor,
at least one titanium oxide precursor,
optionally at least one bismuth oxide and/or cerium oxide precursor,
a solvent or a mixture of solvents,
water.

Suitable silicon oxide precursors are silicon alkoxydes. For instance tetraethylorthosilicate (TEOS), methyltriethoxysilane (MTES), methyltrimethoxysilane (MTMS), (3-aminopropyl)-triethoxysilane (APTES), (3-Glycidyloxypropyl) trimethoxysilane (GPTMS) and the like. Preferred silicon oxide precursors are tetraethylorthosilicate and methyltriethoxysilane. Combinations of different silicone oxide precusors can be used.

Suitable titanium oxide precursors are for instance titanium (IV) isopropoxide, titanium (IV) butoxide or titanium (IV) tert-butoxide. Preferred are titanium (IV) isopropoxide and titanium (IV) butoxide. Combinations of such precursors can be used.

The sol-gel solution may optionally further comprise bismuth oxide or cerium oxide precursors or a mixture of bismuth oxide and cerium oxide precursors.

Suitable precursors of bismuth oxide or cerium oxide are bismuth or cerium salts or organometallic derivatives like metal alkoxides. Examples of such bismuth precursors are bismuth nitrate, bismuth chloride, bismuth citrate, bismuth acetate, bismuth phosphate and the like. Examples of precursors of cerium oxides are cerium nitrate, cerium acetate, cerium chloride, cerium sulfate, cerium acetylacetonate and the like. Certain species may also exist under their hydrate forms which are also suitable precursors. Preferably, the precursor of bismuth oxide is bismuth nitrate and the precursor of cerium oxide is cerium nitrate. Combinations of such precursors can be used.

The sol-gel solution may optionally further comprise zirconium oxide precursors under the form of zirconium alkoxides such as zirconium (IV) butoxide, zirconium (IV) isopropoxide, zirconium (IV) tert-butoxide), or under the form of zirconium (IV) salts such as zirconium(IV) acetylacetonate. Preferred ones are zirconium (IV) butoxide or zirconium (IV) isopropoxide. Combinations of such precursors can be used.

The sol-gel solution may optionally further comprise phosphorous oxide precursors such as phosphoric acid and/or a phosphite alkoxide such as triethylphosphite. Preferred is triethylphosphite.

The sol-gel solution may optionally further comprise precursors of one or several other metal oxides such as Al2O3, Fe2O3, SnO2. Examples of such precursors are the corresponding nitrate or chloride salts.

The solvent or solvent mixture used can be any of those known to the skilled person for sol-gel preparation. These solvents are solvents miscible with water such as alcohols, for instance: methanol, ethanol, isopropanol, butanol, 2-ethoxy-ethanol, 1-methoxy-2-propanol; or ketones such as acetone and methylethylketone. As water-miscible solvents, ethylcellosolve, butylcellosolve, cellosolve acetate, diacetone alcohol, tetrahydrofurfuryl alcohol and mesityl oxide can also be mentioned. Mixtures of solvents can be used.

A catalyst may optionally be used, it can be chosen amongst the catalysts known to the skilled person for sol-gel preparation, such as an inorganic acid, for instance hydrochloric acid, nitric acid, sulfuric acid; or an organic acid such as acetic acid, citric acid, formic acid. Preferred are nitric acid and hydrochloric acid.

A stabilizing agent may also optionally be used, it can be chosen amongst the stabilizing agents known to the skilled person for sol-gel preparation, such as acetylacetone, ethyl acetoacetate or hydroxypropyl cellulose. Preferred is ethyl acetoacetate.

The sol-gel solution may further optionally comprise other additives such as hydrophobic or oleophobic or omniphobic substances to confer an easy maintenance property to the final coating, coloring components (eg. inorganic pigments).

The sol-gel solution can be applied on the substrate by various methods such as bar coating, spin coating, dip coating, spraying (i.e. LP pulverization, HVLP pulverization, airless pulverization or combined spraying technologies like Airmix®, DUO®, . . . ), ultrasonic pulverization, electrospray pulverization, curtain coating, roller coating, slit coating, flow coating, dipping method; or a printing method such as screen printing, gravure printing, ink jet printing and curved-face printing.

The sol-gel solution is applied on at least a part of the face of the substrate provided with the soft coating and above the soft coating. Both the soft coating and the sol-gel solution can cover substantially the entire face of the substrate or they can both cover the same part of the face or the soft coating can cover a part of the face and the sol-gel solution can cover a larger part or substantially the whole face of the substrate.

The sol-gel solution may be applied directly after the step of forming the soft coating on the substrate or one or several optional intermediate steps may be conducted in between.

An optional intermediate step may be for instance the application of one or more intermediate layers between the soft coating and the sol-gel solution. When no intermediate layer are applied, the sol-gel solution is in direct contact with the soft coating, i.e. no intermediate layer is present between the soft coating and the sol-gel solution on the portions of the surface where they are both present. It is preferred that the sol-gel solution is provided in direct contact with the soft coating and at least substantially on the entire soft coating. It is hence preferred that no step of applying an intermediate layer is performed.

Another optional intermediate step might be to move the substrate from a soft coating application line to a sol-gel coating application line.

The process for making a coated substrate according to the invention comprises a step of curing the sol-gel solution to obtain the sol-gel coating of the invention. This step is again performed under conditions known to the skilled person.

The curing step comprises a stage of drying the sol-gel solution during which the solvents and water evaporate leading to the sol-gel. This stage generally takes place at temperatures between room temperature and 300° C. The temperature and time conditions are adapted depending on the type of sol-gel coating applied.

The curing step comprises a second stage of densification of the sol-gel leading to the sol-gel coating. This stage generally takes place at temperatures between 300 and 800° C. It may particularly take place between 400 and 710° C. The temperature and time conditions are adapted depending on the type of soft coating and sol-gel coating applied.

The obtained solid sol-gel coating is usually a uniform network spread out in sheet-like manner. The networks of the invention can have open or closed pores.

In a particular embodiment of the invention wherein the substrate is a glass substrate, the densification stage may take place during a heat treatment associated to the bending/curving, annealing/strengthening or tempering of the coated glass substrate. In a particular variant of this embodiment, the densification stage may take place during tempering of the coated glass substrate.

The coated substrate according to the invention or obtained according to the process of the invention may be used for instance in applications such as buildings, home appliances (oven, fridges, food display), transportation (automobile, bus, boat, train, tramway and the like) or greenhouses.

It advantageously comprises a soft coating having improved mechanical, chemical and corrosion resistance thanks to the presence of the sol-gel coating. These improved performances allow broadening the use of such soft coatings to applications where they are in contact with the external environment, particularly when the coated substrate is a glass substrate. The coated substrate according to the invention or obtained according to the process of the invention has hence a particular interest in the field of glazing units. It is therefore another object of the present invention to provide glazing units comprising at least one coated glass substrate according to the invention or obtained according to the process of the invention, wherein a face of the coated glass substrate provided with the soft coating and the sol-gel coating is facing the outside of the unit.

The glazing unit may be a single glazing unit, i.e. a glazing unit comprising a single glass panel. In this case, the glass panel is a coated glass substrate according to the invention or a laminated glass comprising such coated glass substrate. In both cases, a face of the coated glass substrate provided with the soft coating and the sol-gel coating is facing the outside of the unit.

The glazing unit may be a multiple glazing unit. It is meant by multiple glazing unit a glazing unit comprising at least two glass panels separated by an interspace. It may for instance be a double glazing or a triple glazing. The interspace may be filled in with an insulating gas or the multiple glazing may be a vacuum insulating glazing. The glass panels of said multiple glazing units may be glass sheets or laminated glass or a combination of these. At least one glass panel of the multiple glazing is a coated glass substrate according to the invention or a laminated glass comprising such coated glass substrate. In both cases, a face of the coated glass substrate provided with the soft coating and the sol-gel coating is facing the outside of the unit.

The coated glass substrate is additionally heat treatable or temperable. It is advantageous as more and more heat treated glass is requested in buildings and automotive applications namely for safety purposes. As a result of its safety and strength, tempered glass is used in a variety of demanding applications, including windows, shower doors, architectural glass doors and tables, refrigerator trays, as a component of bulletproof glass, and various types of plates and cookware.

When the soft coating is a solar control or insulating low-E coating, the sol-gel coating does not significantly impact the emissivity of the solar control or insulating low-E coating.

The glazing units of the invention may be used for saving energy in applications such as buildings, transportation (automobile, bus, boat, train, tramway and the like) or greenhouses.

Embodiments of the invention will now be further described by way of examples that are provided for illustrative purposes, and are not intended to limit the scope of this invention.

Comparative Example 1: Preparation of a SiO2 TiO2 Sol-Gel Solution

A precursor mixture is prepared by adding at room temperature 17.02 g of titanium (IV) butoxide and 10.42 g of tetraethylorthosilicate to a mixture of 3.32 g of ethylacetoacetate and 121.60 g of 2-ethoxy-ethanol. 0.022 g of nitric acid (65%) are diluted in 3.60 g of demineralized water and added dropwise in the precursor mixture. The mixture is stirred for 48 h at room temperature.

2 ml of the mixture are spin coated on a clean low-E coated glass substrate (Planibel AS commercialized by Asahi Glass Company). The glass is then dried at 160° C. for 12 minutes and densification is performed under air for 3.5 min at 670° C.

Examples 2 and 3: Preparation of a SiO2 TiO2 ZrO2 Sol-Gel Solutions According to the Invention A solution A is prepared by mixing at room temperature A1 g of ethyl alcohol, A2 g of acetylacetonate and A3 g of titanium (IV) butoxide. A solution B is prepared by mixing at room temperature B1 g of ethyl alcohol, B2 g of acetylacetone and B3 g of zirconium propoxide. A solution C is prepared by adding dropwise solution A in solution B at room temperature under stirring in 2 hours. A solution D is prepared by mixing D1 g of ethyl alcohol, D2 g of acetylacetonate, D3 g of tetraethylorthosilicate. D4 g of a solution of hydrochloric acid 0.1M is added to the solution D. D5 g of demineralized water is added to the solution D. Solution D is stirred at room temperature during 2 hours. The final solution is obtained by adding dropwise in 1 hour solution D in solution C at room temperature under stirring.

2 ml of the final solution are spin coated on a clean low-E coated glass substrate (Planibel AS commercialized by Asahi Glass Company). The glass is then dried at 160° C. for 12 minutes and densification is performed under air for 3.5 min at 670° C.

Comparative Example 4: Preparation of a P2O5 Doped SiO2 TiO2 Sol-Gel Solution A precursor mixture is prepared by adding at room temperature 13.60 g of titanium (IV) butoxide in a mixture of 10.41 g of ethylacetoacetate and 45.06 g of 2-ethoxyethanol. The mixture is stirred at room temperature for 60 minutes. 0.722 g of triethylphosphite is added to the mixture and stirred for 30 min. 10.42 g of tetraethylorthosilicate is added to the mixture and stirred for 30 min. 0,018 g of nitric acid 65% is added. Solution is stirred for 24 h.

2 ml of the solution are spin coated on a clean low-E coated glass substrate (Planibel AS commercialized by Asahi Glass Company). The glass is then dried at 160° C. for 12 minutes and densification is performed under air for 3.5 min at 670° C.

Comparative Example 5: Preparation of a SiO2 Based Sol-Gel Solution

A precursor mixture is prepared by adding at room temperature 8.12 g of tetraethylorthosilicate in 66.80 g of ethyl alcohol and is stirred for 10 minutes. 0.1857 g of nitric acid 5M are diluted in 1.4 g 0 f demineralized water and added dropwise in the precursor mixture. The resulting mixture is stirred for 24 h at room temperature.

2 ml of the mixture are spin coated on a clean low-E coated glass substrate (Planibel AS commercialized by Asahi Glass Company). The glass is then dried at 160° C. for 12 minutes and densification is performed under air for 3.5 min at 670° C.

Properties Evaluation

The samples prepared in examples 1 to 4, comparative example 5 are evaluated in terms of mechanical, chemical and corrosion resistance.

The properties are evaluated according to the following methods:

Neutral salt spray according to ISO 9227-2012. Analysis and results according to EN 1096-2012:

The salt spray cabinet is an Elcometer 1120. Coated glass substrates are evaluated after drying and after densification. The samples are rated from 1 to 5, 5 being not degraded, 1 being very degraded. The test results are summarized in Tables 2 and 3.

Climatic chamber (Weiss WK31000/40) with thermal cycles between 45° C. and 55° C. (heating from 45° C. to 55° C. in 1 hour, cooling from 55° C. to 45° C. in 1 hour) and a relative humidity of 98%. Coated glass substrates are evaluated after drying and after densification. The substrates after treatment in the climatic chamber are rated from 1 to 5, 5 being not degraded, 1 being very degraded. The test results are summarized in Tables 4 and 5. Dry brush test according to ASTM D2486:

The test is performed with an Elcometer 1720 Abrasion and Washability Tester. The test consisted in scrubbing the coated glass for 500 or 1000 cycles with a nylon bristle brush as described in ASTM D2486 standard. The surface is examined in reflection under lighting. If the appearance of the abraded area is distinguishable, the sample is considered as "ko" meaning not having good mechanical resistance. If there is no difference between the abraded area and the non-abraded area, the coating is considered as "ok" meaning having good mechanical resistance according to the invention. Coated glass substrates are evaluated after drying and before densification. The test results are summarized in Table 6.

TABLE 1 amounts (g) of species of examples 2 and 3

| | A1 | A2 | A3 | B1 | B2 | B3 | D1 | D2 | D3 | D4 | D5 |
|---|---|---|---|---|---|---|---|---|---|---|---|
| Example 2 | 7.92 | 0.749 | 1.27 | 17.68 | 1.18 | 1.92 | 7.53 | 0 | 14.09 | 2.58 | 3.95 |
| Example 3 | 9.21 | 2.8 | 4.76 | 17.68 | 1.18 | 1.92 | 7.53 | 0 | 14.09 | 2.58 | 3.95 |

TABLE 2 neutral spray results on coated glass substrates after drying

| Samples | Matrix composition | 2 days | 10 days |
|---|---|---|---|
| Comp. ex. 1 | SiO2—TiO2 | ≥3.5 | <3.5 |
| Ex. 2 | SiO2—TiO2—ZrO2 | ≥3.5 | <3.5 |
| Ex. 3 | SiO2—TiO2—ZrO2 | ≥3.5 | <3.5 |

TABLE 2-continued neutral spray results on coated glass substrates after drying

| Samples | Matrix composition | 2 days | 10 days |
|---|---|---|---|
| Comp. ex. 4 | SiO2—TiO2:P2O5 | ≥3.5 | <3.5 |
| Comp. ex. 5 | SiO2 | ≥3.5 | <3.5 |

TABLE 3 neutral spray results on coated glass substrates after densification

| Samples | Matrix composition | 2 days | 10 days |
|---|---|---|---|
| Comp. ex. 1 | SiO2—TiO2 | ≥3.5 | <3.5 |
| Ex. 2 | SiO2—TiO2—ZrO2 | ≥3.5 | ≥3.5 |
| Ex. 3 | SiO2—TiO2—ZrO2 | ≥3.5 | ≥3.5 |
| Comp. ex. 4 | SiO2—TiO2:P2O5 | ≥3.5 | <3.5 |
| Comp. ex. 5 | SiO2 | ≥3.5 | <3.5 |

TABLE 4 climatic chamber results on coated glass substrates after drying

| Samples | Matrix composition | 3 days | 10 days |
|---|---|---|---|
| Comp. ex. 1 | SiO2—TiO2 | ≥3.5 | <3.5 |
| Ex. 2 | SiO2—TiO2—ZrO2 | ≥3.5 | <3.5 |
| Ex. 3 | SiO2—TiO2—ZrO2 | ≥3.5 | <3.5 |
| Comp. ex. 4 | SiO2—TiO2:P2O5 | ≥3.5 | <3.5 |
| Comp. ex. 5 | SiO2 | ≥3.5 | <3.5 |

TABLE 5 climatic chamber results on coated glass substrates after densification

| Samples | Matrix composition | 3 days | 10 days |
|---|---|---|---|
| Comp. ex. 1 | SiO2—TiO2 | ≥3.5 | <3.5 |
| Ex. 2 | SiO2—TiO2—ZrO2 | ≥3.5 | ≥3.5 |
| Ex. 3 | SiO2—TiO2—ZrO2 | ≥3.5 | ≥3.5 |
| Comp. ex. 4 | SiO2—TiO2:P2O5 | ≥3.5 | <3.5 |
| Comp. ex. 5 | SiO2 | ≥3.5 | <3.5 |

TABLE 6 abrasion resistance results according to the dry brush test on coated glass substrates after drying and before densification.

| Samples | Matrix composition | 500 cycles | 1000 cycles |
|---|---|---|---|
| Comp. ex. 1 | SiO2—TiO2 | ok | ok |
| Ex. 2 | SiO2—TiO2—ZrO2 | ok | ok |
| Ex. 3 | SiO2—TiO2—ZrO2 | ok | ok |
| Comp. ex. 4 | SiO2—TiO2:P2O5 | ok | ok |
| Comp. ex. 5 | SiO2 | ok | ko |

The coated substrates of Examples 2 and 3, and Comparative examples 1 and 4 have improved mechanical resistance in comparison to the coated substrate of Comparative example 5 that fails to pass the test after 1000 cycles (Table 6).

Examples 2 and 3 containing zirconium oxide show an improved humidity resistance after densification in the neutral salt spray and climatic chamber tests (Tables 3 and 5).

Emissivity Measurement:

Emissivity (□) is calculated for a sample according to Example 3. The emissivity of the corresponding reference sample (Planibel AS without sol-gel coating after heat treatment 160° C. for 12 minutes+3.5 min at 670° C.) is also calculated. The emissivity is calculated according to EN673 and ISO 10292.

TABLE 7 emissivity values

| Sample | Emissivity |
|---|---|
| Planibel AS (160° C., 12 min + 670° C., 3.5 min) | 0.05 |
| Example 3 after densification | 0.06 |

The variation of emissivity between a sample with a sol-gel according to the invention and a Planibel AS without sol-gel coating is of 0.01. The emissivity of the Planibel AS is not significantly impacted by the presence of the sol-gel coating.

Example 6: Preparation of a CeO2 Doped SiO2 TiO2 ZrO2 Sol-Gel Solution According the Invention A solution A is prepared by mixing A1 g of ethyl alcohol, A2 g of acetylacetonate and A3 g of Titanium (IV) butoxide. Solution A is stirred at room temperature during 10 minutes. A solution B is prepared by mixing B g of ethyl alcohol, B2 g of acetylacetone, B3 g of Zirconium propoxide and B4 g of Cerium (III) nitrate hexahydrated. Solution B is stirred at room temperature during 10 minutes. A solution C is prepared by pouring solution A in solution B at room temperature under stirring. Pouring of A in B must be performed drop by drop in such a manner that the addition time takes 2 hours. A solution D is prepared by mixing D1 g of ethyl alcohol, D2 g of acetylacetonate, D3 g of tetraethylorthosilicate. D4 g of a solution of hydrochloric acid 0.1M is added to the solution D. D5 g of demineralized water is added to the solution D. Solution D is stirred at room temperature during 2 hours. The final solution is obtained by pouring solution D in solution C at room temperature under stirring. Pouring of D in C must be performed drop by drop in such a manner that the addition time takes 1 hour.

2 ml of the sol-gel are spin coated on standard soda lime glass. The glass is then dried at 160° C. for 12 minutes and densification is performed under air for 3.5 min at 670° C.

The weight percent ratio CeO2/SiO2 is 0.011.

TABLE 8 amounts (g) of species of example 6

| | A1 | A2 | A3 | B1 | B2 | B3 | B4 | D1 | D2 | D3 | D4 | D5 |
|---|---|---|---|---|---|---|---|---|---|---|---|---|
| Example 5 | 6.91 | 8.01 | 13.61 | 3.28 | 2 | 30.11 | 0.056 | 4.2 | 0 | 5 | 2.58 | 2.16 |

Comparative Examples 7 and 8: Preparation of SiO2 TiO2 ZrO2 CeO2 Sol Gel Solutions A solution A is prepared by mixing A1 g of ethyl alcohol, A2 g of acetylacetonate and A3 g of Titanium (IV) butoxide. Solution A is stirred at room temperature during 10 minutes. A solution B is prepared by mixing B1 g of ethyl alcohol, B2 g of acetylacetone, B3 g of Zirconium propoxide and B4 g of Cerium (III) nitrate hexahydrated. Solution B is stirred at room temperature during 10 minutes. A solution C is prepared by pouring solution A in solution B at room temperature under stirring. Pouring of A in B must be performed drop by drop in such a manner that the addition time takes 2 hours. A solution D is prepared by mixing D1 g of ethyl alcohol, D2 g of acetylacetonate, D3 g of tetraethylorthosilicate. D4 g of a solution of hydrochloric acid 0.1M is added to the solution D. D5 g of demineralized water is added to the solution D Solution D is stirred at room temperature during 2 hours. The final solution is obtained by pouring solution D in solution C at room temperature under stirring. Pouring of D in C must be performed drop by drop in such a manner that the addition time takes 1 hour.

2 ml of the sol-gel are spin coated on standard soda lime glass. The glass is then dried at 160° C. for 12 minutes and densification is performed under air for 3.5 min at 670° C.

The weight percent ratio CeO2/SiO2 is 0.40 for Comparative example 7 and 2.3 for Comparative example 8.

TABLE 9 amounts (g) of species of Comparative examples 7 and 8

| | A1 | A2 | A3 | B1 | B2 | B3 | B4 | D1 | D2 | D3 | D4 | D5 |
|---|---|---|---|---|---|---|---|---|---|---|---|---|
| Comparative example 7 | 6.91 | 8.01 | 13.61 | 3.28 | 2 | 30.11 | 2 | 4.2 | 0 | 5 | 2.58 | 2.16 |
| Comparative example 8 | 6.91 | 8.01 | 13.61 | 3.28 | 2 | 30.11 | 11.62 | 4.2 | 0 | 5 | 2.58 | 2.16 |

Tint Measurement:

The tint of a reference sample (standard soda lime glass), samples after drying of Example 6 and Comparative examples 7 and 8 are defined by CIELAB 1976 values (L*a*b*). They are measured with illuminant D65/10°. The results are reported in Table 10.

TABLE 10

Tint values

| Samples | L* | a* | b* |
|---|---|---|---|
| Standard soda lime glass | 96.02 | −0.71 | 0.23 |
| Ex. 6 | 94.38 | 0.86 | 1.29 |
| Comp. ex. 7 | 95.07 | −0.46 | 2.53 |
| Comp. ex. 8 | 94.20 | −2.36 | 6.64 |

An increase in the b* value corresponds to a yellowing. It is apparent from Table 10 that the sol-gel coating of Example 6 according to the invention has a low yellowing effect in comparison to compositions having higher cerium oxide contents like those of Comparative examples 7 and 8.

The invention claimed is:

1. A coated substrate comprising:
   a substrate,
   a first coating comprising one or more layers deposited by physical vapor deposition provided on at least a part of at least one face of the substrate, wherein the first coating is a solar control or insulating low E coating, and
   a sol-gel coating provided on at least a part of said face above the first coating,
   wherein the sol-gel coating comprises a mixture of titanium oxide, zirconium oxide, silicon oxide and optionally bismuth oxide and/or cerium oxide in theoretical weight ratios of:
   titanium oxide $TiO_2$/silicon oxide $SiO_2$ ranging from 0.10 to 3,
   zirconium oxide $ZrO_2$/silicon oxide $SiO_2$ ranging from 0.10 to 3,
   bismuth oxide $Bi_2O_3$/silicon oxide $SiO_2$ ranging from 0 to 0.03, and
   cerium oxide $CeO_2$/silicon oxide $SiO_2$ ranging from 0 to 0.03.

2. The coated substrate according to claim 1, wherein the sol-gel coating is provided on at least a part of the face of the substrate provided with the first coating and in direct contact with the first coating.

3. The coated substrate according to claim 1, wherein the sol-gel coating is provided at least substantially on the entire first coating and in direct contact with the first coating.

4. The coated substrate according to claim 1, wherein the sol-gel coating comprises a mixture of titanium oxide, zirconium oxide, silicon oxide, and bismuth oxide in theoretical weight ratios of:
   titanium oxide $TiO_2$/silicon oxide $SiO_2$ ranging from 0.10 to 3,
   zirconium oxide $ZrO_2$/silicon oxide $SiO_2$ ranging from 0.10 to 3, and
   bismuth oxide $Bi_2O_3$/silicon oxide $SiO_2$ ranging from 0 to 0.03.

5. The coated substrate according to claim 1, wherein the sol-gel coating comprises a mixture of titanium oxide, zirconium oxide, silicon oxide, and cerium oxide in theoretical weight ratios of:
   titanium oxide $TiO_2$/silicon oxide $SiO_2$ ranging from 0.10 to 3,
   zirconium oxide $ZrO_2$/silicon oxide $SiO_2$ ranging from 0.10 to 3, and
   cerium oxide $CeO_2$/silicon oxide $SiO_2$ ranging from 0 to 0.03.

6. The coated substrate according to claim 1, wherein the sol-gel coating comprises a mixture of titanium oxide, zirconium oxide, silicon oxide, and optionally bismuth oxide and/or cerium oxide in theoretical weight ratios of:
   titanium oxide $TiO_2$/silicon oxide $SiO_2$ ranging from 0.25 to 2.5,
   zirconium oxide $ZrO_2$/silicon oxide $SiO_2$ ranging from 0.25 to 2.5,
   bismuth oxide $Bi_2O_3$/silicon oxide $SiO_2$ ranging from 0 to 0.02, and
   cerium oxide $CeO_2$/silicon oxide $SiO_2$ ranging from 0 to 0.02.

7. The coated substrate according to claim 1, wherein the sol-gel coating comprises a mixture of titanium oxide, zirconium oxide, silicon oxide, and optionally bismuth oxide and/or cerium oxide in theoretical weight ratios of:
   titanium oxide $TiO_2$/silicon oxide $SiO_2$ ranging from 0.5 to 2, zirconium oxide $ZrO_2$/silicon oxide $SiO_2$ ranging from 0.5 to 2, bismuth oxide $Bi_2O_3$/silicon oxide $SiO_2$ ranging from 0 to 0.01, and cerium oxide $CeO_2$/silicon oxide $SiO_2$ ranging from 0 to 0.01.

8. The coated substrate according to claim 1, wherein the sol-gel coating comprises a mixture of titanium oxide, zirconium oxide, silicon oxide, and optionally bismuth oxide and/or cerium oxide in theoretical weight ratios of:

titanium oxide $TiO_2$/silicon oxide $SiO_2$ ranging from 1 to 1.5, zirconium oxide $ZrO_2$/silicon oxide $SiO_2$ ranging from 1 to 1.5, bismuth oxide $Bi_2O_3$/silicon oxide $SiO_2$ ranging from 0 to 0.03, and cerium oxide $CeO_2$/silicon oxide $SiO_2$ ranging from 0 to 0.03.

9. The coated substrate according to claim 1, wherein a thickness of the sol-gel coating is from 50 to 500 nm.

10. The coated substrate according to claim 1, wherein the sol gel coating is formed by applying a sol gel solution on at least one face of the substrate.

11. The coated substrate according to claim 1, wherein the substrate is a glass substrate.

12. The coated substrate according to claim 11, wherein the glass substrate is heat treated.

13. The coated substrate according to claim 12, wherein the glass substrate is tempered.

14. A glazing unit comprising at least one coated substrate according to claim 11, wherein a face of the coated substrate provided with the first coating and the sol-gel coating is facing an outside of the unit.

15. The glazing unit according to claim 14, wherein the glazing unit is a single glazing unit comprising one glass panel.

16. The glazing unit according to claim 14, wherein the glazing unit is a multiple glazing unit comprising at least two glass panels separated by an interspace.

17. A process for making the coated substrate according to claim 1, comprising:
    a) forming the first coating on at least a part of at least one face of the substrate,
    b) applying the first sol-gel solution on at least a part of said face above the first coating, and
    c) curing the sol-gel solution to obtain a sol-gel coating comprising a mixture of titanium oxide, zirconium oxide, silicon oxide and optionally bismuth oxide and/or cerium oxide in theoretical weight ratios of:

titanium oxide $TiO_2$/silicon oxide $SiO_2$ ranging from 0.10 to 3, zirconium oxide $ZrO_2$/silicon oxide $SiO_2$ ranging from 0.10 to 3, bismuth oxide $Bi_2O_3$/silicon oxide $SiO_2$ ranging from 0 to 0.03, and cerium oxide $CeO_2$/silicon oxide $SiO_2$ ranging from 0 to 0.03.

18. The process according to claim 17, wherein the substrate is a glass substrate.

19. The process according to claim 18, further comprising, after the curing, d) heating the glass substrate.

20. The process according to claim 19, wherein the heating of the glass substrate is a tempering step.

* * * * *